(12) United States Patent
Li et al.

(10) Patent No.: US 11,337,042 B2
(45) Date of Patent: May 17, 2022

(54) SHORT MESSAGE PROCESSING METHOD AND APPARATUS, AND ELECTRONIC DEVICE

(71) Applicant: Honor Device Co., Ltd., Shenzhen (CN)

(72) Inventors: Shuguang Li, Xi'an (CN); Gaofeng Du, Xi'an (CN)

(73) Assignee: Honor Device Co., Ltd., Shenzhen (CN)

(*) Notice: Subject to any disclaimer, the term of this patent is extended or adjusted under 35 U.S.C. 154(b) by 0 days.

(21) Appl. No.: 16/897,819

(22) Filed: Jun. 10, 2020

(65) Prior Publication Data

US 2020/0374665 A1 Nov. 26, 2020

Related U.S. Application Data

(63) Continuation of application No. 16/204,710, filed on Nov. 29, 2018, now Pat. No. 10,708,726, which is a continuation of application No. 15/735,109, filed as application No. PCT/CN2015/081114 on Jun. 10, 2015, now Pat. No. 10,165,419.

(51) Int. Cl.
*H04M 11/04* (2006.01)
*H04W 4/14* (2009.01)
*G06F 16/00* (2019.01)
*G06F 16/335* (2019.01)

(52) U.S. Cl.
CPC .............. *H04W 4/14* (2013.01); *G06F 16/00* (2019.01); *G06F 16/335* (2019.01)

(58) Field of Classification Search
CPC ....... H04W 4/12; H04W 68/005; H04W 4/06; H04W 4/14; H04W 68/00
See application file for complete search history.

(56) References Cited

U.S. PATENT DOCUMENTS 7,155,243 B2 * 12/2006 Baldwin ................. H04L 51/12
455/466
7,369,867 B2 * 5/2008 Zabawskyj ....... H04L 29/06027
455/466

(Continued)

FOREIGN PATENT DOCUMENTS

CN 101645971 A 2/2010
CN 102209152 A 10/2011
(Continued)

*Primary Examiner* — Khalid W Shaheed
(74) *Attorney, Agent, or Firm* — Conley Rose, P.C.

(57) ABSTRACT

A short message service (SMS) message processing method and apparatus, and an electronic device, are provided in the field of information technologies. The method includes receiving a new SMS message; extracting identification information of the SMS message, where the identification information is information about a number used to send the SMS message and/or a content keyword; determining a processing manner corresponding to the identification information from a prestored correspondence between an identification information group and a processing manner according to the identification information, where each identification information group includes at least one piece of identification information; and processing the SMS message according to the determined processing manner.

20 Claims, 6 Drawing Sheets

(56) References Cited

U.S. PATENT DOCUMENTS

| | | | |
|---|---|---|---|
| 7,899,873 B2 | 3/2011 | Jackson et al. | |
| 9,177,293 B1* | 11/2015 | Gagnon | G06Q 10/107 |
| 9,813,363 B1* | 11/2017 | Caldwell | H04L 51/02 |
| 9,827,497 B2 | 11/2017 | Mizuki et al. | |
| 9,843,556 B2 | 12/2017 | Kim et al. | |
| 9,872,078 B2 | 1/2018 | Goergen et al. | |
| 10,165,419 B2 | 12/2018 | Li et al. | |
| 10,299,087 B2* | 5/2019 | Ben Arzi | H04M 3/42059 |
| 2006/0105750 A1 | 5/2006 | Zabawskyj et al. | |
| 2009/0150497 A1 | 6/2009 | McAfee et al. | |
| 2010/0075701 A1 | 3/2010 | Shang et al. | |
| 2014/0289342 A1 | 9/2014 | Turakhia | |

FOREIGN PATENT DOCUMENTS

| | | |
|---|---|---|
| CN | 102355517 A | 2/2012 |
| CN | 103365986 A | 10/2013 |
| CN | 104010078 A | 8/2014 |
| CN | 104683553 A | 6/2015 |
| WO | 2008113290 A1 | 9/2008 |
| WO | 2015078286 A1 | 6/2015 |

* cited by examiner

SHORT MESSAGE PROCESSING METHOD AND APPARATUS, AND ELECTRONIC DEVICE

CROSS-REFERENCE TO RELATED APPLICATIONS

This application is a continuation of U.S. patent application Ser. No. 16/204,710, filed on Nov. 29, 2018, which is a continuation of U.S. patent application Ser. No. 15/735,109, filed on Dec. 8, 2017, now U.S. Pat. No. 10,165,419. The U.S. patent application Ser. No. 15/735,109 is a national stage of International Application No. PCT/CN2015/081114, filed on Jun. 10, 2015. All of the aforementioned applications are hereby incorporated by reference in their entireties.

TECHNICAL FIELD

The present disclosure relates to the field of information technologies, and in particular, to a short message service (SMS) message processing method and apparatus, and an electronic device.

BACKGROUND

In modern life, as popularity of mobile terminals increases, a growing quantity of users exchange information by using the mobile terminals. By virtue of quickness, convenience, and the like, an SMS message is gradually favored by users. However, many criminals use SMS messages to send a large amount of junk information such as advertisements and false information to the user. Because the junk information brings a great deal of trouble to user's life, how to process the SMS message to build a good communication environment becomes an urgent problem to be solved.

Currently, during SMS message processing, received SMS messages are filtered based on an installed junk SMS message interception application. When a received SMS message is determined as a junk SMS message, the junk SMS message is stored in a junk SMS message storage area.

Because the junk SMS message obtained by means of filtering is still stored in a mobile terminal, storage space of the mobile terminal is occupied. Consequently, performance of the mobile terminal is degraded.

SUMMARY

To resolve a problem in a related technology, embodiments of the present disclosure provide an SMS message processing method and apparatus, and an electronic device, as follows.

According to a first aspect, an SMS message processing method is provided, where the method includes receiving a new SMS message; extracting identification information of the SMS message, where the identification information is information about a number used to send the SMS message and/or a content keyword; determining a processing manner corresponding to the identification information from a prestored correspondence between an identification information group and a processing manner according to the identification information, where each identification information group includes at least one piece of identification information; and processing the SMS message according to the determined processing manner.

With reference to the first aspect, in a first possible implementation of the first aspect, before the determining a processing manner corresponding to the identification information from a prestored correspondence between an identification information group and a processing manner according to the identification information, the method further includes providing an SMS message setting page, where multiple processing manners are displayed on the SMS message setting page; setting, according to a setting operation in the SMS message setting interface, a processing manner corresponding to each piece of identification information; grouping identification information corresponding to a same processing manner based on the processing manner corresponding to each piece of identification information, to form an identification information group; and storing the correspondence between an identification information group and a processing manner.

With reference to the first aspect or the first possible implementation of the first aspect, in a second possible implementation of the first aspect, the processing manner includes a first processing manner, a second processing manner, a third processing manner, and a fourth processing manner, where the first processing manner is corresponding to a first number group and/or a first keyword group, and the first processing manner is to delete a received SMS message or save a received SMS message in a junk SMS message storage area; the second processing manner is corresponding to a second number group and/or a second keyword group, and the second processing manner is to save a received SMS message in a conventional SMS message storage area and provide an information processing dialog box when a view operation on the received SMS message is detected, where a delete option and a save option are displayed in the information processing dialog box; the third processing manner is corresponding to a third number group and/or a third keyword group, and the third processing manner is to save a received SMS message in the conventional SMS message storage area; and the fourth processing manner is corresponding to a fourth number group and/or a fourth keyword group, and the fourth processing manner is to save a received SMS message in a confidential SMS message storage area.

With reference to the second possible implementation of the first aspect, in a third possible implementation of the first aspect, the processing the SMS message according to the determined processing manner includes if the determined processing manner is the first processing manner, deleting the SMS message or saving the SMS message in the junk SMS message storage area according to the first processing manner; if the determined processing manner is the second processing manner, according to the second processing manner, saving the SMS message in the conventional SMS message storage area, and when a view operation on the SMS message is detected, providing the information processing dialog box, and processing the SMS message according to a selected operation in the information processing dialog box; if the determined processing manner is the third processing manner, saving the SMS message in the conventional SMS message storage area according to the third processing manner; or if the determined processing manner is the fourth processing manner, saving the SMS message in the confidential SMS message storage area according to the fourth processing manner.

With reference to the third possible implementation of the first aspect, in a fourth possible implementation of the first aspect, the processing the SMS message according to a selected operation in the information processing dialog box includes if it is detected that the delete option in the information processing dialog box is selected, deleting the SMS message or saving the SMS message in the junk SMS message storage area; or if it is detected that the save option in the information processing dialog box is selected, saving the SMS message, and when a view operation on the SMS message is detected subsequently, skipping providing the information processing dialog box again.

According to a second aspect, an SMS message processing apparatus is provided, where the apparatus includes a receiving module configured to receive a new SMS message; an identification information extraction module configured to extract identification information of the SMS message, where the identification information is information about a number used to send the SMS message and/or a content keyword; a processing manner determining module configured to determine a processing manner corresponding to the identification information from a prestored correspondence between an identification information group and a processing manner according to the identification information, where each identification information group includes at least one piece of identification information; and an SMS message processing module configured to process the SMS message according to the determined processing manner.

With reference to the second aspect, in a first possible implementation of the second aspect, the apparatus further includes a setting page providing module configured to provide an SMS message setting page, where multiple processing manners are displayed on the SMS message setting page; a setting module configured to set, according to a setting operation in the SMS message setting interface, a processing manner corresponding to each piece of identification information; an identification information group forming module configured to group identification information corresponding to a same processing manner based on the processing manner corresponding to each piece of identification information, to form an identification information group; and a storage module configured to store the correspondence between an identification information group and a processing manner.

With reference to the second aspect or the first possible implementation of the second aspect, in a second possible implementation of the second aspect, the processing manner includes a first processing manner, a second processing manner, a third processing manner, and a fourth processing manner, where the first processing manner is corresponding to a first number group and/or a first keyword group, and the first processing manner is to delete a received SMS message or save a received SMS message in a junk SMS message storage area; the second processing manner is corresponding to a second number group and/or a second keyword group, and the second processing manner is to save a received SMS message in a conventional SMS message storage area and provide an information processing dialog box when a view operation on the received SMS message is detected, where a delete option and a save option are displayed in the information processing dialog box; the third processing manner is corresponding to a third number group and/or a third keyword group, and the third processing manner is to save a received SMS message in the conventional SMS message storage area; and the fourth processing manner is corresponding to a fourth number group and/or a fourth keyword group, and the fourth processing manner is to save a received SMS message in a confidential SMS message storage area.

With reference to the second possible implementation of the second aspect, in a third possible implementation of the second aspect, the SMS message processing module is configured to when the determined processing manner is the first processing manner, delete the SMS message or save the SMS message in the junk SMS message storage area according to the first processing manner; the SMS message processing module is configured to when the determined processing manner is the second processing manner, according to the second processing manner, save the SMS message in the conventional SMS message storage area, and when a view operation on the SMS message is detected, provide the information processing dialog box, and process the SMS message according to a selected operation in the information processing dialog box; the SMS message processing module is configured to when the determined processing manner is the third processing manner, save the SMS message in the conventional SMS message storage area according to the third processing manner; or the SMS message processing module is configured to when the determined processing manner is the fourth processing manner, save the SMS message in the confidential SMS message storage area according to the fourth processing manner.

With reference to the third possible implementation of the second aspect, in a fourth possible implementation of the second aspect, the SMS message processing module is configured to when it is detected that the delete option in the information processing dialog box is selected, delete the SMS message or save the SMS message in the junk SMS message storage area; or the SMS message processing module is configured to when it is detected that the save option in the information processing dialog box is selected, save the SMS message, and when a view operation on the SMS message is detected subsequently, skip providing the information processing dialog box again.

According to a third aspect, an electronic device is provided, where the electronic device includes an input unit, a processor unit, an output unit, a communications unit, a storage unit, a peripheral interface, and a power supply, where the storage unit is configured to store program code; the communications unit is configured to receive a new SMS message; and the processor unit invokes, by using a bus, the program code stored in the storage unit in order to perform the following operations, extracting identification information of the SMS message, where the identification information is information about a number used to send the SMS message and/or a content keyword; determining a processing manner corresponding to the identification information from a prestored correspondence between an identification information group and a processing manner according to the identification information, where each identification information group includes at least one piece of identification information; and processing the SMS message according to the determined processing manner.

With reference to the third aspect, in a first possible implementation of the third aspect, before the operation of determining a processing manner corresponding to the identification information from a prestored correspondence between an identification information group and a processing manner according to the identification information, the processor unit is further configured to perform the following operations, providing an SMS message setting page, where multiple processing manners are displayed on the SMS message setting page; setting, according to a setting operation in the SMS message setting interface, a processing manner corresponding to each piece of identification information; grouping identification information corresponding to a same processing manner based on the processing manner corresponding to each piece of identification information, to form an identification information group; and storing the correspondence between an identification information group and a processing manner.

With reference to the third aspect or the first possible implementation of the third aspect, in a second possible implementation of the third aspect, the processing manner includes a first processing manner, a second processing manner, a third processing manner, and a fourth processing manner, where the first processing manner is corresponding to a first number group and/or a first keyword group, and the first processing manner is to delete a received SMS message or save a received SMS message in a junk SMS message storage area; the second processing manner is corresponding to a second number group and/or a second keyword group, and the second processing manner is to save a received SMS message in a conventional SMS message storage area and provide an information processing dialog box when a view operation on the received SMS message is detected, where a delete option and a save option are displayed in the information processing dialog box; the third processing manner is corresponding to a third number group and/or a third keyword group, and the third processing manner is to save a received SMS message in the conventional SMS message storage area; and the fourth processing manner is corresponding to a fourth number group and/or a fourth keyword group, and the fourth processing manner is to save a received SMS message in a confidential SMS message storage area.

With reference to the second possible implementation of the third aspect, in a third possible implementation of the third aspect, the operation in which the processor unit processes the SMS message according to the determined processing manner includes when the determined processing manner is the first processing manner, deleting the SMS message or saving the SMS message in the junk SMS message storage area according to the first processing manner; when the determined processing manner is the second processing manner, according to the second processing manner, saving the SMS message in the conventional SMS message storage area, and when a view operation on the SMS message is detected, providing the information processing dialog box, and processing the SMS message according to a selected operation in the information processing dialog box; when the determined processing manner is the third processing manner, saving the SMS message in the conventional SMS message storage area according to the third processing manner; or when the determined processing manner is the fourth processing manner, saving the SMS message in the confidential SMS message storage area according to the fourth processing manner.

With reference to the third possible implementation of the third aspect, in a fourth possible implementation of the third aspect, the operation in which the processor unit processes the SMS message according to a selected operation in the information processing dialog box includes when it is detected that the delete option in the information processing dialog box is selected, deleting the SMS message or saving the SMS message in the junk SMS message storage area; or when it is detected that the save option in the information processing dialog box is selected, saving the SMS message, and when a view operation on the SMS message is detected subsequently, skipping providing the information processing dialog box again.

When the SMS message is received, the identification information of the SMS message is extracted such that SMS messages that have different identification information are processed in different processing manners, thereby optimizing an SMS message processing manner, preventing a junk SMS message from occupying storage space, and improving performance of a mobile terminal.

BRIEF DESCRIPTION OF DRAWINGS

To describe the technical solutions in the embodiments of the present disclosure more clearly, the following briefly describes the accompanying drawings for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
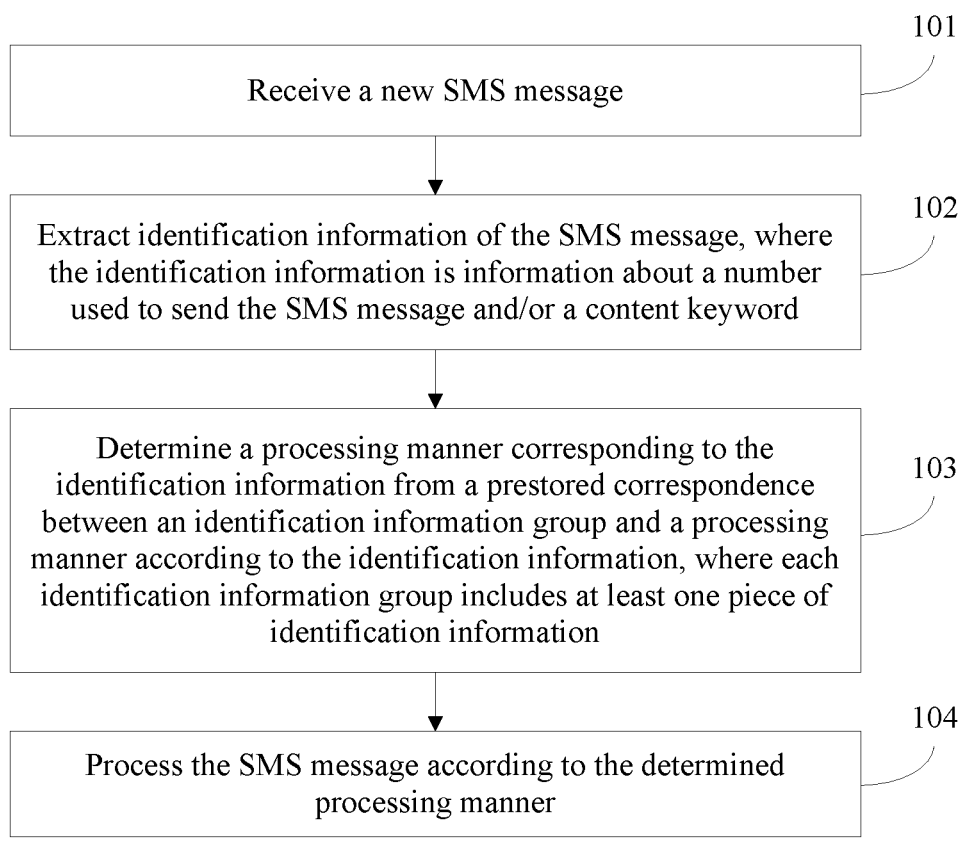
FIG. 1 is a flowchart of an SMS message processing method according to an embodiment of the present disclosure.

With development of information technologies, information security has become the user's upmost concern currently. Although some junk SMS messages may be intercepted by using a junk SMS message interception application installed on a mobile terminal, there are still some SMS messages sent to the mobile terminal of the user in all sorts of ways. These junk SMS messages are stored in the mobile terminal, or stored in a conventional SMS message storage area together with an SMS message sent by a close friend of the user, or stored in a junk SMS message storage area alone. Because these junk SMS messages occupy a memory of the mobile terminal, performance of the mobile terminal is degraded, and when the user expects to clean up these junk SMS messages, a cleanup process is cumbersome. Therefore, an embodiment of the present disclosure provides an SMS message processing method. According to the method, different SMS messages are processed in different processing manners such that not only a good communication environment is built for the user, but also the performance of the mobile terminal is greatly improved. Referring to FIG. 1, a procedure of the method provided in this embodiment includes the following steps.

101. Receive a new SMS message.

102. Extract identification information of the SMS message, where the identification information is information about a number used to send the SMS message and/or a content keyword.

The identification information may be the information about the number used to send the SMS message, including a service number, a mobile number, or the like, may be the content keyword included in the SMS message, may be the information about the number used to send the SMS message and the content keyword, or the like.

103. Determine a processing manner corresponding to the identification information from a prestored correspondence between an identification information group and a processing manner according to the identification information, where each identification information group includes at least one piece of identification information.

In this embodiment, a processing manner for processing the received SMS message includes but is not limited to a first processing manner, a second processing manner, a third processing manner, a fourth processing manner, and the like.

The first processing manner is mainly for processing of SMS messages in which the user shows no interest. These SMS messages are usually false information, illegal information, and the like, and the first processing manner is used to instruct a mobile terminal to delete a received SMS message or save a received SMS message in a junk SMS message storage area.

The second processing manner is mainly for processing of SMS messages in which the user shows relatively great interest. These SMS messages are usually advertisement information, service information, and the like, and the second processing manner is used to instruct the mobile terminal to save a received SMS message in a conventional SMS message storage area and provide an information processing dialog box when a view operation on the received SMS message is detected, where multiple options such as a delete option and a save option are displayed in the information processing dialog box.

The third processing manner is mainly for processing of an SMS message sent by a colleague, a friend, or the like of the user, and the third processing manner is used to instruct the mobile terminal to save a received SMS message in the conventional SMS message storage area.

The fourth processing manner is mainly for processing of an SMS message sent by a relative or the like of the user, and the fourth processing manner is used to instruct the mobile terminal to save a received SMS message in a confidential SMS message storage area.

In addition, a corresponding processing manner may be preset for each identification information group in order to facilitate processing of a received SMS message in subsequent steps. The first processing manner is corresponding to a first number group and/or a first keyword group, the second processing manner is corresponding to a second number group and/or a second keyword group, the third processing manner is corresponding to a third number group and/or a third keyword group, and the fourth processing manner is corresponding to a fourth number group and/or a fourth keyword group.

104. Process the SMS message according to the determined processing manner.

In this embodiment, corresponding processing may be performed on the received SMS message based on the determined processing manner.

According to the method provided in this embodiment of the present disclosure, when the SMS message is received, the identification information of the SMS message is extracted such that SMS messages that have different identification information are processed in different processing manners, thereby optimizing an SMS message processing manner, preventing a junk SMS message from occupying storage space, and improving performance of the mobile terminal.

In another embodiment of the present disclosure, before the determining a processing manner corresponding to the identification information from a prestored correspondence between an identification information group and a processing manner according to the identification information, the method further includes providing an SMS message setting page, where multiple processing manners are displayed on the SMS message setting page; setting, according to a setting operation in the SMS message setting interface, a processing manner corresponding to each piece of identification information; grouping identification information corresponding to a same processing manner based on the processing manner corresponding to each piece of identification information, to form an identification information group; and storing the correspondence between an identification information group and a processing manner.

In another embodiment of the present disclosure, the processing the SMS message according to the determined processing manner includes if the determined processing manner is the first processing manner, deleting the SMS message or saving the SMS message in the junk SMS message storage area according to the first processing manner; if the determined processing manner is the second processing manner, according to the second processing manner, saving the SMS message in the conventional SMS message storage area, and when a view operation on the SMS message is detected, providing the information processing dialog box, and processing the SMS message according to a selected operation in the information processing dialog box; if the determined processing manner is the third processing manner, saving the SMS message in the conventional SMS message storage area according to the third processing manner; or if the determined processing manner is the fourth processing manner, saving the SMS message in the confidential SMS message storage area according to the fourth processing manner.

In another embodiment of the present disclosure, the processing the SMS message according to a selected operation in the information processing dialog box includes if it is detected that the delete option in the information processing dialog box is selected, deleting the SMS message or saving the SMS message in the junk SMS message storage area; or if it is detected that the save option in the information processing dialog box is selected, saving the SMS message, and when a view operation on the SMS message is detected subsequently, skipping providing the information processing dialog box again.

All the foregoing optional technical solutions may be combined in any manner to form an optional embodiment of the present disclosure, and details are not described herein.

Figure 2:
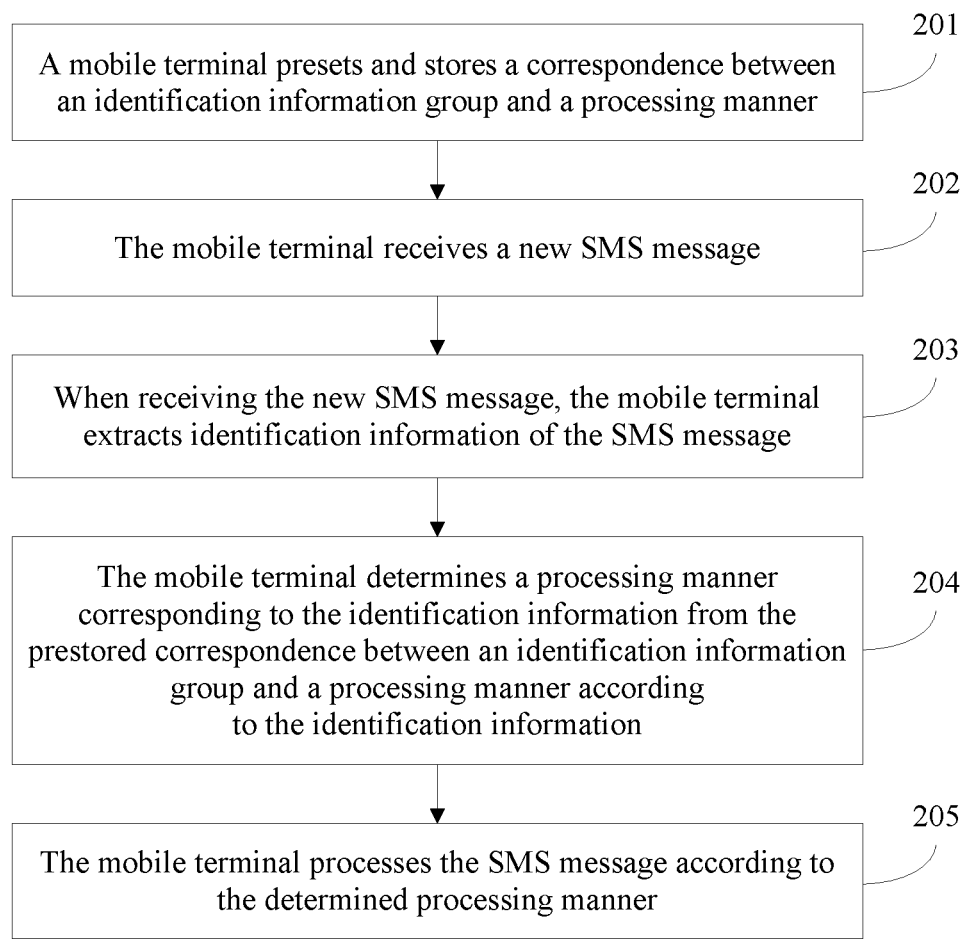
FIG. 2 is a flowchart of an SMS message processing method according to another embodiment of the present disclosure.

An embodiment of the present disclosure provides an SMS message processing method with reference to the embodiment shown in FIG. 1. That a mobile terminal that has an SMS message receiving/transmitting function such as a mobile phone performs the method is used as an example. Referring to FIG. 2, a procedure of the method provided in this embodiment of the present disclosure includes the following steps.

201. A mobile terminal presets and stores a correspondence between an identification information group and a processing manner.

In this embodiment, to perform classified processing on SMS messages that have different identification information, the mobile terminal has different storage areas, and the different storage areas may be classified into a junk SMS message storage area, a conventional SMS message storage area, a confidential SMS message storage area, and the like.

Specific positions of the junk SMS message storage area, the conventional SMS message storage area, and the confidential SMS message storage area in the mobile terminal are not limited in this embodiment, provided that the junk SMS message storage area, the conventional SMS message storage area, and the confidential SMS message storage area can be distinguished.

According to the method provided in this embodiment, the correspondence between an identification information group and a processing manner may be set based on an important role of the identification information in order to process a received SMS message pertinently such that an important SMS message of a user can be effectively prevented from being deleted while quickly cleaning up a junk SMS message.

When setting the correspondence between an identification information group and a processing manner, the mobile terminal may provide an SMS message setting page. Multiple processing manners are displayed on the SMS message setting page. The user sets, in the SMS message setting interface, a corresponding processing manner for each piece of identification information according to a requirement of the user, and the mobile terminal sets, by detecting a setting operation of the user on the setting page, the processing manner corresponding to each piece of identification information. Generally, each processing manner is corresponding to multiple pieces of identification information. Therefore, for ease of management, the mobile terminal groups identification information corresponding to a same processing manner based on the processing manner corresponding to each piece of identification information, to form an identification information group. In this case, there is also a correspondence between an identification information group and a processing manner.

It should be noted that for different content of identification information, a manner in which the mobile terminal sets the correspondence between an identification information group and a processing manner is also different. When identification information is information about a number used to send an SMS message, the mobile terminal may recommend number information stored in the mobile terminal to the user, and the user sets, on the SMS message setting page, a corresponding processing manner for each piece of recommended number information. The number information stored in the mobile terminal may be contact number information stored in an address book, may be contact number information in a history communication record, or the like. When the identification information is a content keyword included in an SMS message, the mobile terminal may extract a content keyword from an SMS message stored in the mobile terminal, and recommend the extracted content keyword to the user, and the user may further define a content keyword according to an information receiving requirement of the user, and then set, on the SMS message prompt page, corresponding processing manners for the recommended content keyword and the defined content keyword. When the identification information is information about a number used to send an SMS message and a content keyword, the mobile terminal recommends, to the user, number information stored in the mobile terminal and a content keyword extracted from a stored SMS message, and the user may further define a content keyword according to an information receiving requirement of the user, and then set, on the SMS message setting page, corresponding processing manners for the recommended number information, the recommended content keyword, and the defined content keyword.

It should be noted that the correspondence between an identification information group and a processing manner is set by the user according to a requirement of the user in the foregoing. However, in some approaches, the mobile terminal may further perform setting recommendation for the user. For example, the mobile terminal prompts the user to set SMS messages corresponding to specific pieces of number information to SMS messages that need to be stored, to set SMS messages corresponding to specific numbers to SMS messages that need to be deleted, or the like; or prompts the user to set SMS messages that include specific content keywords to SMS messages that need to be stored, to set SMS messages that include specific content keywords to SMS messages that need to be deleted, or the like.

After the setting operation, the following correspondence exists between a processing manner and an identification information group.

A first processing manner is corresponding to a first identification information group. The first identification information group may be a first number group, a first keyword group, or a first number group and a first keyword group. That is, the first processing manner may be corresponding to the first number group, the first processing manner may be corresponding to the first keyword group, or the first processing manner may be corresponding to the first number group and the first keyword group.

A second processing manner is corresponding to a second identification information group. The second identification information group may be a second number group, a second keyword group, or a second number group and a second keyword group. That is, the second processing manner may be corresponding to the second number group, the second processing manner may be corresponding to the second keyword group, or the second processing manner may be corresponding to the second number group and the second keyword group.

A third processing manner is corresponding to a third identification information group. The third identification information group may be a third number group, a third keyword group, or a third number group and a third keyword group. That is, the third processing manner may be corresponding to the third number group, the third processing manner may be corresponding to the third keyword group, or the third processing manner may be corresponding to the third number group and the third keyword group.

A fourth processing manner is corresponding to a fourth identification information group. The fourth identification information group may be a fourth number group, a fourth keyword group, or a fourth number group and a fourth keyword group. That is, the fourth processing manner may be corresponding to the fourth number group, the fourth processing manner may be corresponding to the fourth keyword group, or the fourth processing manner may be corresponding to the fourth number group and the fourth keyword group.

In the method provided in this embodiment, the specified correspondence between an identification information group and a processing manner is further stored after the correspondence between an identification information group and a processing manner is preset in order to facilitate subsequent application. During storage, the preset correspondence between identification information and a processing manner may be stored in a local storage unit, such as a memory or a flash memory. Certainly, another storage manner may be used, and is not described herein.

It should be noted that there is no need to preset the correspondence between an identification information group and a processing manner each time the SMS message processing method is implemented. The correspondence between an identification information group and a processing manner may be preset when the SMS message processing method is first implemented, and the specified correspondence between an identification information group and a processing manner may be directly used when the SMS message processing method is implemented subsequently. Certainly, when a preset identification information group and processing manner need to be updated, for example, when an operation such as addition, deletion, or changing is performed on identification information in the identification information group corresponding to the preset processing manner, the step of setting the correspondence between an identification information group and a processing manner may be performed again, and a quantity of times of performing the step is not limited in this embodiment.

202. The mobile terminal receives a new SMS message.

In the communications field, when a first mobile terminal needs to establish a session with a second mobile terminal by using an SMS message, the first mobile terminal sends a packet that carries number information to a server, and after receiving the packet that carries the number information and that is sent by the first mobile terminal, the server sends, to the second mobile terminal, the packet that carries the number information and that is sent by the first mobile terminal, to enable the first mobile terminal to establish the session with the second mobile terminal. The packet is a new SMS message received by the second mobile terminal. The first mobile terminal is a sender of the SMS message, and the second mobile terminal is a recipient of the SMS message, that is, the mobile terminal that performs the SMS message processing method in this embodiment.

203. The mobile terminal extracts identification information of the SMS message.

Because the SMS message processing manner provided in this embodiment is mainly for processing of a received new SMS message, each time a new SMS message is received, the mobile terminal may directly extract identification information of the new SMS message, and then process the new SMS message according to the extracted identification information in order to avoid missing any SMS message that needs to be processed. However, if there is a large quantity of received new SMS messages, and a processor unit of the mobile terminal has no sufficient resources to process each received new SMS message, the mobile terminal may save the received new SMS message in a temporary storage medium such as a cache; and when the processor unit of the mobile terminal has sufficient resources to process the received new SMS message, the mobile terminal may read the new SMS message from the temporary storage medium, extract identification information from the new SMS message, and then process the new SMS message according to the extracted identification information.

Because the SMS message received by the mobile terminal is usually a compressed package of the SMS message, and coding data with a specific format may be obtained after the compressed package of the SMS message is decoded, the mobile terminal may extract, according to the decoded data from data that indicates a number used to send the SMS message, the number used to send the SMS message, and filter, by using a content keyword included in the preset identification information group as a filtering condition, data that indicates content of the SMS message. If the data that indicates the content of the SMS message includes the content keyword in the identification information group, the mobile terminal extracts the content keyword from the data that indicates the content of the SMS message; or if the data that indicates the content of the SMS message does not include the content keyword in the identification information, the mobile terminal does not extract any information from the data that indicates the content of the SMS message.

204. The mobile terminal determines a processing manner corresponding to the identification information from the prestored correspondence between an identification information group and a processing manner according to the identification information.

After extracting the identification information from the received new SMS message, the mobile terminal may determine, based on the prestored correspondence between identification information and a processing manner, the processing manner corresponding to the identification information.

In an embodiment of the present disclosure, when the identification information extracted from the SMS message is first identification information, that is, the number used to send the SMS message belongs to the first number group, or the SMS message includes a content keyword in the first keyword group, or the number used to send the SMS message belongs to the first number group and the SMS message includes a content keyword in the first keyword group, the processing manner for the SMS message may be determined as the first processing manner.

In an embodiment of the present disclosure, when the identification information extracted from the SMS message is second identification information, that is, the number used to send the SMS message belongs to the second number group, or the SMS message includes a content keyword in the second keyword group, or the number used to send the SMS message belongs to the second number group and the SMS message includes a content keyword in the second keyword group, the processing manner for the SMS message may be determined as the second processing manner.

In an embodiment of the present disclosure, when the identification information extracted from the SMS message is third identification information, that is, the number used to send the SMS message belongs to the third number group, or the SMS message includes a content keyword in the third keyword group, or the number used to send the SMS message belongs to the third number group and the SMS message includes a content keyword in the third keyword group, the processing manner for the SMS message may be determined as the third processing manner.

In an embodiment of the present disclosure, when the identification information extracted from the SMS message is fourth identification information, that is, the number used to send the SMS message belongs to the fourth number group, or the SMS message includes a content keyword in the fourth keyword group, or the number used to send the SMS message belongs to the fourth number group and the SMS message includes a content keyword in the fourth keyword group, the processing manner for the SMS message may be determined as the fourth processing manner.

It should be noted that during determining of the processing manner corresponding to the identification information, any one of the three manners of matching by using a number used to send the SMS message, a content keyword, and the number used to send the SMS message and the content keyword is used as an example for description. However, in some approaches, because matching by using the number used to send the SMS message is faster, the number information extracted from the SMS message may be first matched with number information corresponding to each processing manner during determining of the processing manner corresponding to the identification information according to the extracted identification information. When the extracted number information belongs to number information corresponding to any processing manner, the processing manner is determined as the processing manner for the SMS message; or when the extracted number information does not belong to number information corresponding to any processing manner, the content keyword extracted from the SMS message is matched with a content keyword corresponding to each processing manner, and when the content keyword extracted from the SMS message belongs to a content keyword corresponding to any processing manner, the processing manner is determined as the processing manner for the SMS message.

205. The mobile terminal processes the SMS message according to the determined processing manner.

That the mobile terminal processes the SMS message based on the determined processing manner includes but is not limited to the following cases.

First case, the determined processing manner is the first processing manner.

When the processing manner is the first processing manner, it indicates that the received SMS message is an SMS message in which the user shows no interest. The mobile terminal may directly delete the SMS message in order to prevent the SMS message from occupying storage space of the mobile terminal. Certainly, the mobile terminal may save the SMS message in the junk SMS message storage area in order to facilitate subsequent viewing by the user.

Second case, the determined processing manner is the second processing manner.

When the determined processing manner is the second processing manner, it indicates that the received SMS message is an SMS message in which the user shows relatively great interest. In this case, the mobile terminal stores the SMS message in the conventional SMS message storage area. Then, when detecting a view operation performed by the user on the SMS message, the mobile terminal provides an information processing dialog box, the user may select different options in the information processing dialog box according to a degree of interest in content included in the SMS message, and the mobile terminal processes the SMS message by detecting a selected operation of the user in the information processing dialog box. If the mobile terminal detects that a delete option in the information processing dialog box is selected, the mobile terminal generates a deletion instruction, and triggered by the deletion instruction, the mobile terminal deletes the SMS message from the conventional SMS message storage area, or stores the SMS message in the junk SMS message storage area; or if the mobile terminal detects that a save option in the information processing dialog box is selected, the mobile terminal generates a save instruction, and triggered by the save instruction, the mobile terminal stores the SMS message, and if the mobile terminal detects a view operation on the SMS message subsequently, the mobile terminal no longer provides the information processing dialog box.

Figure 3:
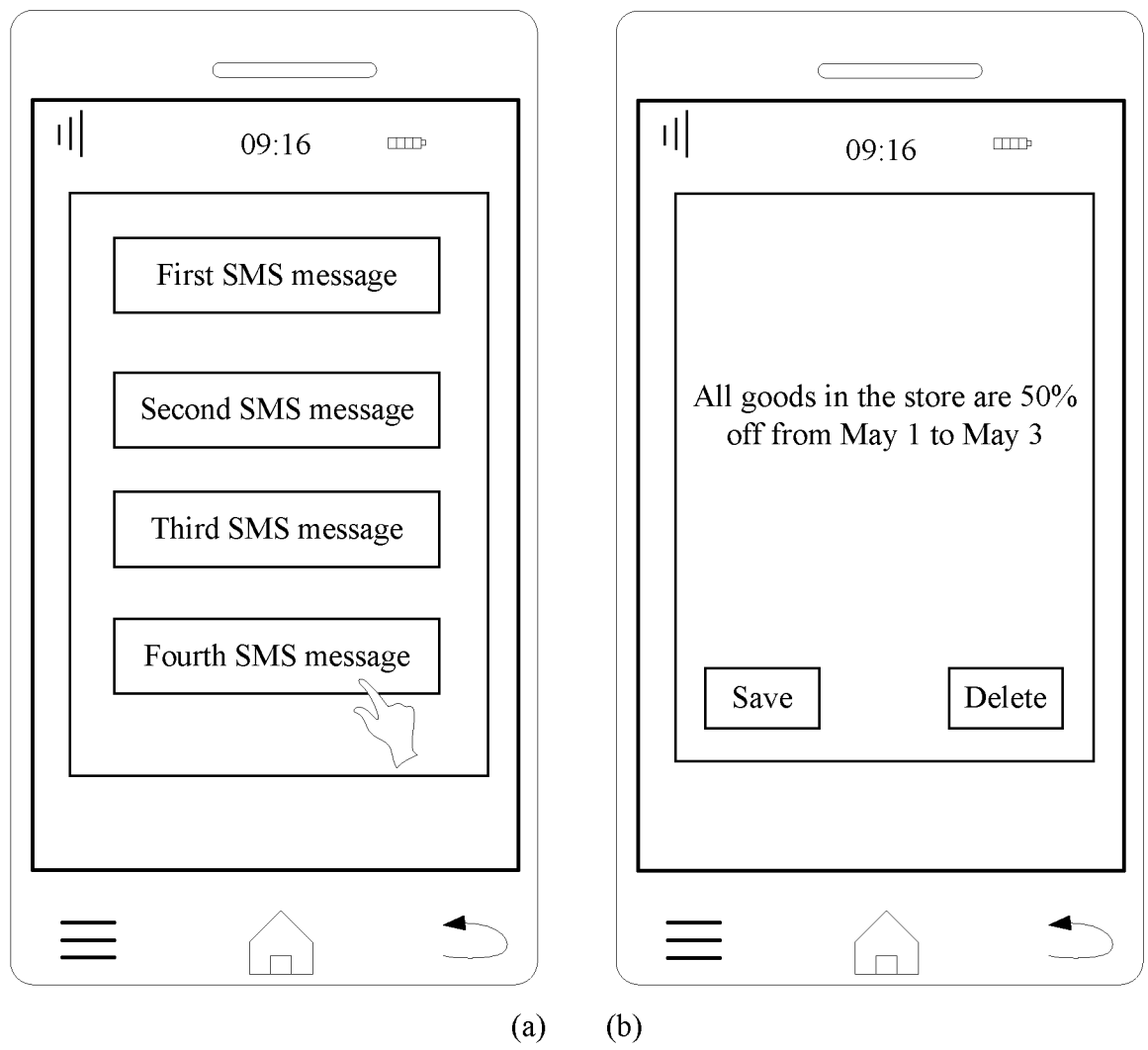
FIG. 3 is a schematic diagram of a terminal display screen according to another embodiment of the present disclosure.

For ease of understanding, the following uses FIG. 3 as an example to describe a processing process described in the second case.

Four SMS messages are displayed on a display screen of (a) in FIG. 3, and are respectively a first SMS message, a second SMS message, a third SMS message, and a fourth SMS message. Processing manners corresponding to the first SMS message, the second SMS message, and the third SMS message are each the first manner, and a processing manner corresponding to the fourth SMS message is the second processing manner. When detecting a view operation performed by the user on the fourth SMS message, as shown in (b) in FIG. 3, the mobile terminal displays, on the display screen, content of the fourth SMS message, and the mobile terminal provides an information processing dialog box. If the mobile terminal detects that a delete option in the information processing dialog box is selected, the mobile terminal generates a deletion instruction, and triggered by the deletion instruction, the mobile terminal deletes the fourth SMS message from the conventional SMS message storage area, or stores the fourth SMS message in the junk SMS message storage area; or if the mobile terminal detects that a save option in the information processing dialog box is selected, the mobile terminal generates a save instruction, and triggered by the save instruction, the mobile terminal stores the fourth SMS message, and when subsequently detecting a view operation performed by the user on the fourth SMS message, the mobile terminal no longer provides the information processing dialog box.

It should be noted that for the first case and the second case, according to the method provided in this embodiment, all SMS messages in the junk SMS message storage area are deleted after the received SMS message is stored in the junk SMS message storage area in order to improve performance of the mobile terminal.

In an embodiment of the present disclosure, the mobile terminal presets a processing period, and the processing period is set by the user on the SMS message setting page, and may be one day, two days, three days, or the like. Then, the mobile terminal deletes, based on the specified processing period, all SMS messages in the junk SMS message storage area at intervals of the processing period.

In another embodiment of the present disclosure, the mobile terminal may further preset a threshold, for example, 30% or 20%. When remaining storage space of the junk SMS message storage area is less than the threshold, the mobile terminal may delete all SMS messages in the junk SMS message storage space.

Third case, the determined processing manner is the third processing manner.

When the determined processing manner is the third processing manner, it indicates that the received SMS message is an SMS message sent by a colleague, a friend, or the like of the user. In this case, the mobile terminal directly stores the SMS message in the conventional SMS message storage area.

Fourth case, the determined processing manner is the fourth processing manner.

When the determined processing manner is the fourth processing manner, it indicates that the received SMS message is an important SMS message sent by a relative or the like of the user. The mobile terminal may store the important SMS message in the confidential SMS message storage area in order to prevent the important SMS message from being deleted.

According to the method provided in this embodiment of the present disclosure, when the SMS message is received, the identification information of the SMS message is extracted such that SMS messages that have different identification information are processed in different processing manners, thereby optimizing an SMS message processing manner, preventing a junk SMS message from occupying storage space, and improving the performance of the mobile terminal.

Figure 4:
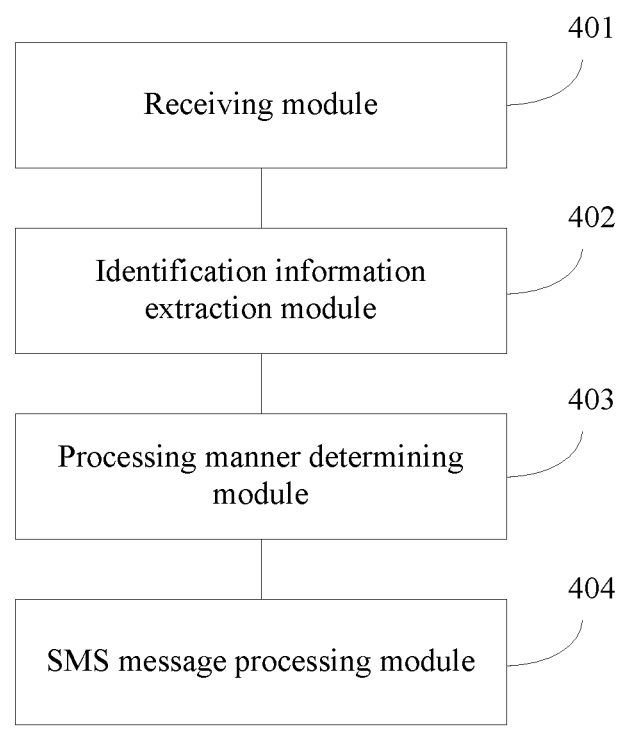
FIG. 4 is schematic structural diagram of an SMS message processing apparatus according to another embodiment of the present disclosure.

An embodiment of the present disclosure provides an SMS message processing apparatus. Referring to FIG. 4, the apparatus includes a receiving module 401 configured to receive a new SMS message; an identification information extraction module 402 configured to extract identification information of the SMS message, where the identification information is information about a number used to send the SMS message and/or a content keyword; a processing manner determining module 403 configured to determine a processing manner corresponding to the identification information from a prestored correspondence between an identification information group and a processing manner according to the identification information, where each identification information group includes at least one piece of identification information; and an SMS message processing module 404 configured to process the SMS message according to the determined processing manner.

Figure 5:
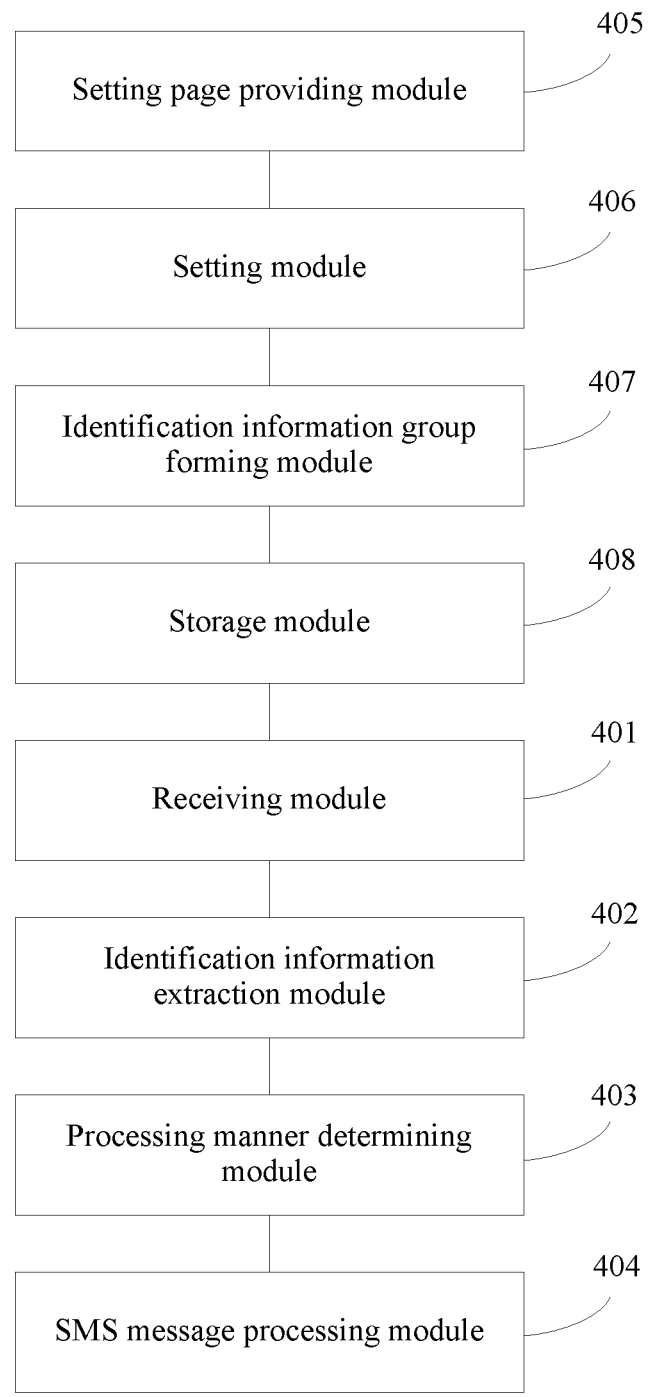
FIG. 5 is schematic structural diagram of an SMS message processing apparatus according to another embodiment of the present disclosure.

Referring to FIG. 5, the apparatus further includes a setting page providing module 405 configured to provide an SMS message setting page, where multiple processing manners are displayed on the SMS message setting page; a setting module 406 configured to set, according to a setting operation in the SMS message setting interface, a processing manner corresponding to each piece of identification information; an identification information group forming module 407 configured to group identification information corresponding to a same processing manner based on the processing manner corresponding to each piece of identification information, to form an identification information group; and a storage module 408 configured to store the correspondence between an identification information group and a processing manner.

In another embodiment of the present disclosure, the processing manner includes a first processing manner, a second processing manner, a third processing manner, and a fourth processing manner.

The first processing manner is corresponding to a first number group and/or a first keyword group, and the first processing manner is to delete a received SMS message or save a received SMS message in a junk SMS message storage area; the second processing manner is corresponding to a second number group and/or a second keyword group, and the second processing manner is to save a received SMS message in a conventional SMS message storage area and provide an information processing dialog box when a view operation on the received SMS message is detected, where a delete option and a save option are displayed in the information processing dialog box; the third processing manner is corresponding to a third number group and/or a third keyword group, and the third processing manner is to save a received SMS message in the conventional SMS message storage area; and the fourth processing manner is corresponding to a fourth number group and/or a fourth keyword group, and the fourth processing manner is to save a received SMS message in a confidential SMS message storage area.

In another embodiment of the present disclosure, the SMS message processing module 404 is configured to when the determined processing manner is the first processing manner, delete the SMS message or save the SMS message in the junk SMS message storage area according to the first processing manner; the SMS message processing module 404 is configured to when the determined processing manner is the second processing manner, according to the second processing manner, save the SMS message in the conventional SMS message storage area, and when a view operation on the SMS message is detected, provide the information processing dialog box, and process the SMS message according to a selected operation in the information processing dialog box; the SMS message processing module 404 is configured to when the determined processing manner is the third processing manner, save the SMS message in the conventional SMS message storage area according to the third processing manner; or the SMS message processing module 404 is configured to when the determined processing manner is the fourth processing manner, save the SMS message in the confidential SMS message storage area according to the fourth processing manner.

In another embodiment of the present disclosure, the SMS message processing module 404 is configured to when it is detected that the delete option in the information processing dialog box is selected, delete the SMS message or save the SMS message in the junk SMS message storage area; or the SMS message processing module 404 is configured to when it is detected that the save option in the information processing dialog box is selected, save the SMS message, and when a view operation on the SMS message is detected subsequently, skip providing the information processing dialog box again.

In conclusion, according to the apparatus provided in this embodiment of the present disclosure, when the SMS message is received, the identification information of the SMS message is extracted such that SMS messages that have different identification information are processed in different processing manners, thereby optimizing an SMS message processing manner, preventing a junk SMS message from occupying storage space, and improving performance of a mobile terminal.

Figure 6:
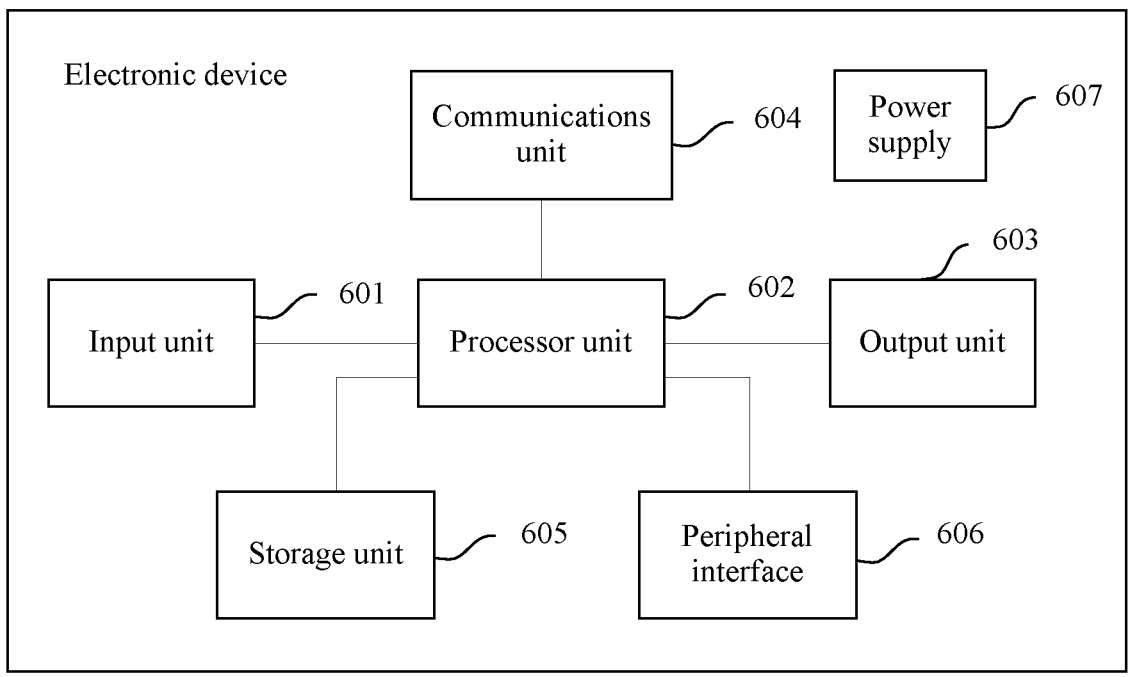
FIG. 6 is a schematic structural diagram of an electronic device according to another embodiment of the present disclosure.

FIG. 6 shows an electronic device according to a specific implementation of the present disclosure. The electronic device includes components such as an input unit 601, a processor unit 602, an output unit 603, a communications unit 604, a storage unit 605, and a peripheral unit 606. These components perform communication by using one or more buses. A person skilled in the art may understand that a structure of the electronic device shown in the figure constitutes no limitation on the present disclosure. The structure may be a bus structure, or may be a star structure, or may include more or fewer parts than those shown in the figure, or a combination of some parts, or different part arrangements. In the implementation of the present disclosure, the electronic device may be any mobile or portable electronic device, including but not limited to a mobile phone, a mobile computer, a tablet computer, a personal digital assistant (PDA), a media player, a smart television, a combination of two or more thereof, and the like.

The input unit 601 is configured to implement interaction between a user and the electronic device and/or input information to the electronic device. For example, the input unit 601 may receive digit or character information input by the user in order to generate signal input related to user setting or function control. In a specific implementation of the present disclosure, the input unit may be a touch panel, or may be another human-machine interaction interface, such as a substantive input key or a microphone, or may be another external information obtaining apparatus, for example, a camera. The touch panel, also referred to as a touchscreen or a touchscreen, may collect an operation action that the user touches or approaches on the touch panel, for example, an operation action performed by the user on the touch panel or at a position close to the touch panel by using any proper object or accessory, such as a finger or a stylus, and drive a corresponding connection apparatus according to a preset program. Optionally, the touch panel may include two parts, a touch detection apparatus and a touch controller. The touch detection apparatus detects a touch operation of the user, converts the detected touch operation into an electrical signal, and sends the electrical signal to the touch controller. The touch controller receives the electrical signal from the touch detection apparatus, and converts the electrical signal into contact coordinates, and then sends the contact coordinates to the processor unit. The touch controller may further receive and execute a command sent by the processor unit. In addition, the touch panel may be implemented in multiple types, such as a resistive type, a capacitive type, infrared, and a surface acoustic wave. In another implementation of the present disclosure, the substantive input key used by the input unit 601 may include but is not limited to one or more of a physical keyboard, a function key (such as a volume control key or on/off keying), a trackball, a mouse, a joystick, or the like. The input unit 601 in a microphone form may collect a voice input by the user or an environment, and convert the voice into a command that is in an electrical signal form and that may be executed by the processor unit.

In some other implementations of the present disclosure, the input unit 601 may further be various types of sensing devices, for example, a hall device configured to detect a physical quantity of the electronic device, such as force, torque, pressure, stress, a position, a displacement, a speed, acceleration, an angle, an angular velocity, a rotational number, a rotational speed, and a time at which a working status changes, and convert the physical quantity into an electric quantity for detection and control. Some other sensing devices may further include a gravity sensor, a tri-axis accelerometer, a gyroscope, and the like.

The processor unit 602 is a control center of the electronic device, is connected to all parts of an entire electronic device by using various interfaces and lines, and executes various functions of the electronic device and/or processes data by running or executing a software program and/or a module stored in the storage unit 605 and invoking data stored in the storage unit 602. The processor unit 602 is configured to invoke, by using a bus, program code stored in the storage unit 605 in order to perform the following operations, receiving a new SMS message; extracting identification information of the SMS message, where the identification information is information about a number used to send the SMS message and/or a content keyword; determining a processing manner corresponding to the identification information from a prestored correspondence between an identification information group and a processing manner according to the identification information, where each identification information group includes at least one piece of identification information; and processing the SMS message according to the determined processing manner.

In another embodiment of the present disclosure, before the operation of determining a processing manner corresponding to the identification information from a prestored correspondence between an identification information group and a processing manner according to the identification information, the processor unit 602 is further configured to perform the following operations, providing an SMS message setting page, where multiple processing manners are displayed on the SMS message setting page; setting, according to a setting operation in the SMS message setting interface, a processing manner corresponding to each piece of identification information; grouping identification information corresponding to a same processing manner based on the processing manner corresponding to each piece of identification information, to form an identification information group; and storing the correspondence between an identification information group and a processing manner.

In another embodiment of the present disclosure, the processing manner includes a first processing manner, a second processing manner, a third processing manner, and a fourth processing manner.

The first processing manner is corresponding to a first number group and/or a first keyword group, and the first processing manner is to delete a received SMS message or save a received SMS message in a junk SMS message storage area; the second processing manner is corresponding to a second number group and/or a second keyword group, and the second processing manner is to save a received SMS message in a conventional SMS message storage area and provide an information processing dialog box when a view operation on the received SMS message is detected, where a delete option and a save option are displayed in the information processing dialog box; the third processing manner is corresponding to a third number group and/or a third keyword group, and the third processing manner is to save a received SMS message in the conventional SMS message storage area; and the fourth processing manner is corresponding to a fourth number group and/or a fourth keyword group, and the fourth processing manner is to save a received SMS message in a confidential SMS message storage area.

In another embodiment of the present disclosure, the operation in which the processor unit 602 processes the SMS message according to the determined processing manner includes when the determined processing manner is the first processing manner, deleting the SMS message or saving the SMS message in the junk SMS message storage area according to the first processing manner; when the determined processing manner is the second processing manner, according to the second processing manner, saving the SMS message in the conventional SMS message storage area, and when a view operation on the SMS message is detected, providing the information processing dialog box, and processing the SMS message according to a selected operation in the information processing dialog box; when the determined processing manner is the third processing manner, saving the SMS message in the conventional SMS message storage area according to the third processing manner; or when the determined processing manner is the fourth processing manner, saving the SMS message in the confidential SMS message storage area according to the fourth processing manner.

In another embodiment of the present disclosure, the operation in which the processor unit 602 processes the SMS message according to a selected operation in the information processing dialog box includes when it is detected that the delete option in the information processing dialog box is selected, deleting the SMS message or saving the SMS message in the junk SMS message storage area; or when it is detected that the save option in the information processing dialog box is selected, saving the SMS message, and when a view operation on the SMS message is detected subsequently, skipping providing the information processing dialog box again.

The processor unit 602 may include an integrated circuit (IC), for example, the processor unit 602 may include a single encapsulated IC, or may include multiple encapsulated ICs that have a same function or different functions and that are connected. For example, the processor unit 602 may include only a central processing unit (CPU), and may be a combination of a graphical processing unit (GPU), a digital signal processor (DSP), and a control chip (for example, a baseband chip) in the communications unit 604. In an implementation of the present disclosure, the CPU may be a single operation core, or may include multiple operation cores.

The communications unit 604 is configured to establish a communication channel such that the electronic device is connected to a remote server by using the communication channel, and downloads media data from the remote server. The communications unit 606 may include a communications module, such as a wireless local area network (WLAN) module, a Bluetooth module, and a baseband (Base Band) module, and a radio frequency (RF) circuit corresponding to the communications module, and is configured to perform wireless local area network communication, Bluetooth communication, infrared communication and/or cellular communications system communication, such as Wideband Code Division Multiple Access (WCDMA) and/or High Speed Download Packet Access (HSDPA). The communications module is configured to control communication between all components in the electronic device, and may support direct memory access.

In different implementations of the present disclosure, various communications modules in the communications unit 604 usually appear in a form of an IC chip, and may be selectively combined instead of including all communications modules and corresponding antenna groups. For example, the communications unit 604 may include only a baseband chip, a RF chip, and a corresponding antenna in order to provide a communication function in a cellular communications system. The electronic device may be connected to a cellular network or the Internet by using a wireless communication connection established by the communications unit, such as wireless local area network access or WCDMA access. In some optional implementations of the present disclosure, the communications module in the communications unit 604, for example, the baseband module may be integrated into the processor unit 602. In this embodiment of the present disclosure, the communications unit 604 may be configured to receive the new SMS message.

The RF circuit is configured to receive and send a signal in an information receiving/transmitting process or a call process. For example, after receiving downlink information of a base station, the RF circuit sends the downlink information to the processor unit for processing; and in addition, sends designed uplink data to the base station. Generally, the RF circuit includes a well-known circuit configured to execute these functions, including but not limited to an antenna system, a RF transceiver, one or more amplifiers, a tuner, one or more oscillators, a digital signal processor, a codec chip set, a subscriber identity module (SIM) card, a memory, and the like. In addition, the RF circuit may communicate with a network and another device by means of radio communications. The radio communications may use any communications standard or protocol, including but not limited to global system of mobile (GSM) communication, general packet radio service (GPRS), code division multiple access (CDMA) wideband code division multiple access (WCDMA), a high speed uplink packet access (HSUPA) technology, long term evolution (LTE), an email, an SMS, and the like.

The output unit 603 includes but is not limited to an image output unit and an audio output unit. The image output unit is configured to output a text, a picture, and/or a video. The image output unit may include a display panel, for example, a display panel configured in a form of a liquid crystal display (LCD), an organic light-emitting diode (OLED), a field emission display (FED), and the like; or the image output unit may include a reflective display, such as an electrophoretic display or a display that uses an interferometric modulation of light technology. The image output unit may include a single display or multiple displays with different sizes. In a specific implementation of the present disclosure, the touch panel used by the input unit 601 may also be used as a display panel of the output unit. For example, after detecting a gesture operation of touching or approaching on the touch panel, the touch panel sends the gesture operation to the processor unit 602 to determine a type of a touch event, and then the processor unit provides corresponding visual output on the display panel according to the type of the touch event. In FIG. 6, the input unit 601 and the output unit 603 serve as two separate parts to implement input and output functions of the electronic device, but in some embodiments, the touch panel and the display panel may be integrated to implement the input and output functions of the electronic device. For example, the image output unit may display various graphical user interfaces (GUI) as virtual control components, including but not limited to a window, a scroll bar, an icon, and a scrapbook such that the user performs an operation in a touch manner.

In a specific implementation of the present disclosure, the image output unit includes a filter and an amplifier that are configured to filter and amplify a video output by the processor unit. The audio output unit includes a digital-to-analog converter configured to convert an audio signal output by the processor unit from a digital format to an analog format.

The storage unit 605 may be configured to store a software program and a module, and the processor unit 602 executes various function applications of the electronic device and implements data processing, by running the software program and the module stored in the storage unit 605. The storage unit 605 mainly includes a program storage area and a data storage area. The program storage area may store an operating system, an application program required by at least one function, such as an audio playing program or an image playing program; and the data storage area may store data (such as audio data or a phone book) created according to use of the electronic device, and the like. In a specific implementation of the present disclosure, the storage unit 605 may include a volatile memory, such as a nonvolatile random access memory (NVRAM), a phase change random access memory (PRAM), or a magnetoresistive random access memory (MRAM), or may include a nonvolatile memory, such as at least one magnetic disk storage device, an electrically erasable programmable read-only memory (EEPROM), or a flash device, such as a NOR flash memory or a NAND flash memory. The nonvolatile memory stores an operating system and an application program that are executed by the processor unit. The processor unit 602 loads a running program and data from the nonvolatile memory to a memory, and stores digital content in a large number of storage apparatuses. The operating system includes various components and/or drivers that are configured to control and manage a regular system task, such as memory management, storage device control, or power management and that facilitate communication between various types of software and hardware. In the implementation of the present disclosure, the operating system may be an Android system, an iOS system, a Windows operating system, an embedded operating system such as Vxworks, or the like.

The application program includes any application installed on the electronic device, including but not limited to a browser, an email, an instant message service, text processing, keyboard virtualization, a widget, encryption, digital copyright management, speech recognition, speech replication, positioning (for example, a function provided by a Global Positioning System (GPS)), music playing, and the like.

The electronic device further includes a power supply 607. The power supply 607 is configured to supply power to different parts of the electronic device to maintain running of the parts. Generally, the power supply 607 may be a built-in battery, such as a common lithium-ion battery or an NiMH battery, or may be an external power supply that directly supplies power to the electronic device, for example, an AC adapter. In some implementations of the present disclosure, the power supply 607 may be further defined in a wider scope. For example, the power supply 607 may further include a power management system, a charging system, a power failure detection circuit, a power converter or inverter, a power status indicator (for example, a light emitting diode), and any other components related to electric energy generation, management, and distribution of the electronic device.

According to the electronic device provided in this embodiment of the present disclosure, when the SMS message is received, the identification information of the SMS message is extracted such that SMS messages that have different identification information are processed in different processing manners, thereby optimizing an SMS message processing manner, preventing a junk SMS message from occupying storage space, and improving performance of the mobile terminal.

It should be noted that when the SMS message processing apparatus and the electronic device that are provided in the foregoing embodiments process the SMS message, division of the foregoing function modules is merely used as an example for illustration. In some approaches, the foregoing functions can be allocated to different function modules and implemented according to a requirement, that is, inner structures of the SMS message processing apparatus and the electronic device are divided into different function modules to implement all or part of the functions described above. In addition, the SMS message processing method, the SMS message processing apparatus, and the electronic device that are provided in the foregoing embodiments pertain to a same concept. For a specific implementation process, refer to the method embodiments, and details are not described herein.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

The invention claimed is:

1. A short message service (SMS) message processing method implemented by a mobile phone, the SMS message processing method comprising:
   receiving a first user operation setting a first number corresponding to saving a SMS message in a junk SMS message storage area;
   receiving a second user operation setting a first keyword corresponding to saving a SMS message in the junk SMS message storage area;
   receiving a third user operation setting a second keyword corresponding to saving a SMS message in a conventional SMS message storage area, wherein the second keyword is different than the first keyword;
   receiving a first SMS message from the first number and including the first keyword;
   saving the first SMS message in the junk SMS message storage area responsive to receiving the first SMS message;
   receiving a second SMS message from the first number and including the second keyword; and
   saving the second SMS message in the conventional SMS message storage area responsive to receiving the second SMS message.

2. The SMS message processing method of claim 1, further comprising:
   detecting a view operation performed by a user on the first SMS message;
   providing an information processing dialog box, wherein the information processing dialog box comprises a delete option; and
   deleting the first SMS message in response to detecting a selection of the information processing dialog box.

3. An electronic device, comprising:
   a memory configured to store instructions; and
   a processor coupled to the memory and configured to execute the instructions to cause the electronic device to:
      receive a first user operation to set a first number corresponding to saving a short message service (SMS) message in a junk SMS message storage area;
      receive a second user operation to set a first keyword corresponding to saving a SMS message in the junk SMS storage area;
      receive a third user operation to set a second keyword corresponding to saving a SMS message in a conventional SMS message storage area, wherein the second keyword is different than the first keyword;
      receive a first SMS message from the first number and including the first keyword;
      save the first SMS message in the junk SMS message storage area responsive to receiving the first SMS message;
      receive a second SMS message from the first number and including the second keyword; and
      save the second SMS message in the conventional SMS message storage area responsive to receiving the second SMS message.

4. The electronic device of claim 3, wherein the instructions further cause the electronic device to:
   detect a view operation performed by a user on the first SMS message;
   provide an information processing dialog box, wherein the information processing dialog box comprises a delete option; and
   delete the first SMS message in response to detecting a selection of the information processing dialog box.

5. A computer program product comprising instructions for storage on a non-transitory computer-readable medium that, when executed by a processor, cause an apparatus to:
   receive a first user operation to set a first number corresponding to saving a short message service (SMS) message in a junk SMS message storage area;
   receive a second user operation to set a first keyword corresponding to saving a SMS message in the junk SMS message storage area;

receive a third user operation setting a second keyword corresponding to saving a SMS message in a conventional SMS message storage area, wherein the second keyword is different than the first keyword;

receive a first SMS message from the first number and including the first keyword;

save the first SMS message in the junk SMS message storage area responsive to receiving the first SMS message;

receive a second SMS message from the first number and including the second keyword; and save the second SMS message in the conventional SMS message storage area responsive to receiving the second SMS message.

6. The computer program product of claim 5, wherein the instructions further cause the apparatus to:

detect a view operation performed by a user on the first SMS message;

provide an information processing dialog box, wherein the information processing dialog box comprises a delete option; and delete the first SMS message in response to detecting a selection of the information processing dialog box.

7. The electronic device of claim 3, wherein the instructions further cause the electronic device to:

receive a third SMS message from a second number and including the second keyword; and save the third SMS message in the conventional SMS message storage area responsive to receiving the third SMS message.

8. The electronic device of claim 3, wherein the instructions further cause the electronic device to group the first number and the first keyword into a first identification information group, wherein the first identification information group corresponds to saving a SMS message in the junk SMS message storage area.

9. The electronic device of claim 3, wherein the instructions further cause the electronic device to:

receive a fourth user operation setting a third keyword corresponding to saving a SMS message in the conventional SMS message storage area, wherein the third keyword is different than the first keyword, and wherein the third keyword is different than the second keyword; and group the second keyword and third keyword into a second identification information group, wherein the second identification information group corresponds to saving a SMS message in the conventional SMS message storage area.

10. The electronic device of claim 3, wherein the instructions further cause the electronic device to:

receive a fifth user operation setting a third number corresponding to saving a SMS message in the junk SMS message storage area, wherein the third number is different than the first number, and wherein the third number is different than the second number; and group the first number and third number into a third identification information group, wherein the third identification information group corresponds to saving a SMS message in the junk SMS message storage area.

11. The electronic device of claim 3, wherein the instructions further cause the electronic device to:

display an information processing dialog box when a view operation on a SMS message in the conventional SMS message storage area is detected, wherein the information processing dialog box comprises a delete option; and delete the SMS message in the conventional SMS message storage area or moving the SMS message to the junk SMS message storage area in response to detecting a selection of the delete option.

12. The electronic device of claim 11, wherein the information processing dialog box comprises a save option, and wherein the instructions further cause the electronic device to:

save the SMS message in the conventional SMS message storage area in response to detecting a selection of the save option; and skip providing the information processing dialog box again in response to detecting a subsequent view operation on the SMS message.

13. The computer program product of claim 5, wherein the instructions further cause the apparatus to:

receive a third SMS message from a second number and including the second keyword; and save the third SMS message in the conventional SMS message storage area responsive to receiving the third SMS message.

14. The computer program product of claim 5, wherein the instructions further cause the apparatus to group the first number and the first keyword into a first identification information group, wherein the first identification information group corresponds to saving a SMS message in the junk SMS message storage area.

15. The computer program product of claim 5, wherein the instructions further cause the apparatus to:

receive a fourth user operation setting a third keyword corresponding to saving a SMS message in the conventional SMS message storage area, wherein the third keyword is different than the first keyword, and wherein the third keyword is different than the second keyword; and group the second keyword and third keyword into a second identification information group, wherein the second identification information group corresponds to saving a SMS message in the conventional SMS message storage area.

16. The computer program product of claim 5, wherein the instructions further cause the apparatus to:

receive a fifth user operation setting a third number corresponding to saving a SMS message in the junk SMS message storage area, wherein the third number is different than the first number, and wherein the third number is different than the second number; and group the first number and third number into a third identification information group, wherein the third identification information group corresponds to saving a SMS message in the junk SMS message storage area.

17. The computer program product of claim 5, wherein the instructions further cause the apparatus to:

display an information processing dialog box when a view operation on a SMS message in the conventional SMS message storage area is detected, wherein the information processing dialog box comprises a delete option; and delete the SMS message in the conventional SMS message storage area or moving the SMS message to the junk SMS message storage area in response to detecting a selection of the delete option.

18. The computer program product of claim 17, wherein the information processing dialog box comprises a save option, and wherein the instructions further cause the apparatus to:

save the SMS message in the conventional SMS message storage area in response to detecting a selection of the save option; and skip providing the information processing dialog box again in response to detecting a subsequent view operation on the SMS message.

19. The SMS message processing method of claim 1, further comprising:

receiving a third SMS message from a second number and including the second keyword; and saving the third SMS message in the conventional SMS message storage area responsive to receiving the third SMS message.

20. The SMS message processing method of claim 1, further comprising grouping the first number and the first keyword into a first identification information group, wherein the first identification information group corresponds to saving a SMS message in the junk SMS message storage area.

* * * * *

UNITED STATES PATENT AND TRADEMARK OFFICE
CERTIFICATE OF CORRECTION

PATENT NO. : 11,337,042 B2
APPLICATION NO. : 16/897819
DATED : May 17, 2022
INVENTOR(S) : Shuguang Li and Gaofeng Du Page 1 of 1

It is certified that error appears in the above-identified patent and that said Letters Patent is hereby corrected as shown below:

In the Claims

Claim 3, Column 22, Line 30: "to seta first" should read "to set a first"

Signed and Sealed this
Twenty-fourth Day of September, 2024

Katherine Kelly Vidal
*Director of the United States Patent and Trademark Office*